(12) United States Patent
Sutton et al.

(10) Patent No.: US 8,591,724 B2
(45) Date of Patent: Nov. 26, 2013

(54) FEED DELIVERY SYSTEM FOR A SOLID-LIQUID SEPARATION VESSEL

(75) Inventors: Clay R. Sutton, Redondo Beach, CA (US); Ken N. Sury, Calgary (CA); Darwin Edward Kiel, New Westminster (CA); John Khai-Quang Diep, Burnaby (CA)

(73) Assignee: ExxonMobil Upstream Research Company, Houston, TX (US)

( * ) Notice: Subject to any disclaimer, the term of this patent is extended or adjusted under 35 U.S.C. 154(b) by 687 days.

(21) Appl. No.: 12/780,554

(22) Filed: May 14, 2010

(65) Prior Publication Data
US 2011/0011769 A1    Jan. 20, 2011

(30) Foreign Application Priority Data
Jul. 14, 2009  (CA) ..................................... 2672004

(51) Int. Cl.
*C10C 3/08* (2006.01)
*B03D 1/00* (2006.01)
*B01D 21/24* (2006.01)

(52) U.S. Cl.
USPC .............................. 208/45; 210/703; 210/800

(58) Field of Classification Search
USPC ..................................... 208/45; 210/703, 800
See application file for complete search history.

(56) References Cited

U.S. PATENT DOCUMENTS

| | | |
|---|---|---|
| 3,858,654 A | 1/1975 | Walker |
| 3,966,598 A * | 6/1976 | Ettelt .............................. 210/703 |
| 4,676,889 A | 6/1987 | Hsieh et al. |
| 4,776,949 A | 10/1988 | Leung et al. |
| 5,039,227 A | 8/1991 | Leung et al. |
| 5,147,556 A | 9/1992 | Taylor |
| 5,223,148 A | 6/1993 | Tipman et al. |
| 5,236,577 A | 8/1993 | Tipman et al. |
| 5,264,118 A | 11/1993 | Cymerman et al. |
| 5,274,572 A | 12/1993 | O'Neill et al. |
| 5,429,250 A | 7/1995 | Dobson et al. |
| 5,781,430 A | 7/1998 | Tsai |
| 5,876,592 A | 3/1999 | Tipman et al. |
| 5,913,022 A | 6/1999 | Tinaztepe et al. |
| 5,920,718 A | 7/1999 | Uczekaj et al. |

(Continued)

FOREIGN PATENT DOCUMENTS

| | | |
|---|---|---|
| CA | 940853 | 1/1974 |
| CA | 2075108 | 1/1994 |

(Continued)

*Primary Examiner* — Randy Boyer
(74) *Attorney, Agent, or Firm* — ExxonMobil Upstream Research Company—Law Department

(57) ABSTRACT

A method of delivering feed, for example a paraffinic solvent treated bitumen froth, to a separation vessel, for example a froth separation unit (FSU). The feed is delivered from one or more side inlets that may be substantially normal to, and flush with, the wall of the vessel. In contrast to certain conventional feed systems used in gravity separators which use a distributor plate to widely distribute the feed with a vessel, the feed is delivered such that it flows down the inside wall of the vessel. This feed delivery is characterized by a Richardson number of greater than 1.0. Such feed delivery is particularly useful where the feed has particles with a bi-modal size distribution to be separated from an overflow stream. The gentle flow serves to mitigate the upward flux of the smaller particles, for example mineral solids, by being trapped below the larger particles, for example precipitated asphaltene aggregates.

17 Claims, 9 Drawing Sheets

(56) References Cited

U.S. PATENT DOCUMENTS

| | | |
|---|---|---|
| 5,968,349 A | 10/1999 | Duyvesteyn et al. |
| 6,007,709 A | 12/1999 | Duyvesteyn et al. |
| 6,028,819 A | 2/2000 | Mullarkey et al. |
| 6,074,558 A | 6/2000 | Duyvesteyn et al. |
| 6,119,870 A | 9/2000 | Maciejewski et al. |
| 6,182,014 B1 | 1/2001 | Kenyon et al. |
| 6,191,787 B1 | 2/2001 | Lu et al. |
| 6,195,092 B1 | 2/2001 | Dhond et al. |
| 6,214,213 B1 | 4/2001 | Tipman et al. |
| 6,323,679 B1 | 11/2001 | Robertson et al. |
| 6,358,403 B1 | 3/2002 | Brown et al. |
| 6,358,404 B1 | 3/2002 | Brown et al. |
| 6,374,252 B1 | 4/2002 | Althoff et al. |
| 6,401,081 B1 | 6/2002 | Montgomery et al. |
| 6,411,922 B1 | 6/2002 | Clark et al. |
| 6,498,988 B1 | 12/2002 | Robert et al. |
| 6,678,642 B1 | 1/2004 | Budge |
| 6,712,215 B2 | 3/2004 | Scheybeler |
| 6,731,994 B2 | 5/2004 | Heching et al. |
| 6,731,998 B2 | 5/2004 | Walser et al. |
| 6,800,116 B2 | 10/2004 | Stevens et al. |
| 6,829,570 B1 | 12/2004 | Thambynayagam et al. |
| 6,910,001 B2 | 6/2005 | Hammersley et al. |
| 6,934,931 B2 | 8/2005 | Plumer et al. |
| 6,980,935 B2 | 12/2005 | Lu et al. |
| 6,980,940 B1 | 12/2005 | Gurpinar et al. |
| 6,996,803 B2 | 2/2006 | Sakamoto et al. |
| 7,067,811 B2 | 6/2006 | Long et al. |
| 7,141,162 B2 | 11/2006 | Garner et al. |
| 7,282,136 B2 | 10/2007 | Howdeshell |
| 7,296,274 B2 | 11/2007 | Cohen et al. |
| 7,357,857 B2 | 4/2008 | Hart et al. |
| 7,376,472 B2 | 5/2008 | Wojsznis et al. |
| 7,451,066 B2 | 11/2008 | Edwards et al. |
| 7,478,024 B2 | 1/2009 | Gurpinar et al. |
| 7,499,841 B2 | 3/2009 | Hoffman |
| 7,516,446 B2 | 4/2009 | Choi et al. |
| 7,546,578 B2 | 6/2009 | Yang |
| 2003/0018490 A1 | 1/2003 | Magers et al. |
| 2003/0125818 A1 | 7/2003 | Johnson |
| 2003/0139907 A1 | 7/2003 | McCarthy |
| 2004/0054564 A1 | 3/2004 | Fonseca et al. |
| 2004/0111428 A1 | 6/2004 | Rajan et al. |
| 2005/0027559 A1 | 2/2005 | Rajan et al. |
| 2005/0150844 A1 | 7/2005 | Hyndman et al. |
| 2005/0263437 A1 | 12/2005 | Howdeshell |
| 2006/0111903 A1 | 5/2006 | Kemmochi et al. |
| 2006/0113218 A1 | 6/2006 | Hart et al. |
| 2006/0138036 A1 | 6/2006 | Garner et al. |
| 2006/0138055 A1 | 6/2006 | Garner et al. |
| 2006/0196812 A1 | 9/2006 | Beetge et al. |
| 2006/0249439 A1 | 11/2006 | Garner et al. |
| 2006/0260980 A1 | 11/2006 | Yeung |
| 2006/0282243 A1 | 12/2006 | Childs et al. |
| 2007/0111903 A1 | 5/2007 | Engel et al. |
| 2007/0112079 A1 | 5/2007 | McDaniel et al. |
| 2007/0156377 A1 | 7/2007 | Gurpinar et al. |
| 2007/0168057 A1 | 7/2007 | Blevins et al. |
| 2007/0168741 A1 | 7/2007 | Chadha et al. |
| 2008/0208552 A1 | 8/2008 | Kumar et al. |
| 2008/0217212 A1 | 9/2008 | Garner et al. |
| 2008/0288226 A1 | 11/2008 | Gurpinar et al. |

FOREIGN PATENT DOCUMENTS

| | | |
|---|---|---|
| CA | 2200899 | 9/1998 |
| CA | 2232929 | 9/1998 |
| CA | 2353109 | 1/2003 |
| CA | 2502943 | 5/2004 |
| CA | 2505411 | 7/2004 |
| CA | 2425840 | 10/2004 |
| CA | 2435113 | 1/2005 |
| CA | 2493677 | 6/2005 |
| CA | 2455011 | 7/2005 |
| CA | 2490734 | 6/2006 |
| CA | 2502329 | 9/2006 |
| CA | 2521248 | 3/2007 |
| WO | WO 99/33936 | 7/1999 |

* cited by examiner

FEED DELIVERY SYSTEM FOR A SOLID-LIQUID SEPARATION VESSEL

CROSS-REFERENCE TO RELATED APPLICATION

This application claims priority from Canadian Patent Application 2,672,004 filed Jul. 14, 2009 entitled FEED DELIVERY SYSTEM FOR A SOLID-LIQUID SEPARATION VESSEL, the entirety of which is incorporated by reference herein.

FIELD OF THE INVENTION

This invention is in the field of solid-liquid gravity driven separation vessels. More particularly, this invention relates to the feed delivery system used in a solid-liquid gravity driven separation vessel.

BACKGROUND OF THE INVENTION

Many industrial processes require solid particles to be separated from a continuous liquid phase. In gravity separators, a slurry stream comprising liquid and solid particles is delivered to a vessel where the solid particles settle by gravity and are removed from the bottom of the vessel, while the clarified liquid is removed from the top of the vessel. In most processes, the solid particles are distributed in size, where the large particles settle more quickly and the small particles settle more slowly. Particles that have settling velocities smaller than the upward flux (superficial velocity) of liquid may not settle at all, but may instead be carried over with the clarified liquid. Optimum separation efficiency is generally achieved in conventional separators by having a uniform upward velocity distribution as this determines the theoretical limit of the maximum particle size that can be carried over. Increasing the vessel size for example decreases the upward velocity and thereby reduces the size of the largest particles that carry-over, thereby increasing the fraction of particles that report to the underflow. The manner in which the feed is delivered to the separation vessel can affect solid-liquid separation efficiency. Conventional feed delivery methods are often designed to distribute feed over a broad cross-section of the vessel, where the objective is to reduce the solids concentration, thereby reducing hindered settling and increasing the terminal velocities of the particles. The two primary objectives of a conventional feed distributor designed for broad particle size distributions are therefore to achieve a uniform upward velocity distribution and to broadly distribute the feed over the vessel cross-section. Examples of common feed distribution systems include a vertical pipe passing through the top of the vessel combined with a horizontal deflector plate, a feed-well designed to both decelerate and distribute the slurry, and multi-arm or concentric ring spargers.

SUMMARY OF THE INVENTION

Consistent with an aspect of the instant invention, a very different feed delivery system is required in those applications where it is important to separate a significant fraction of the fine particles having terminal velocities much smaller that the superficial upward velocity. In this case, a specialized feed delivery system is required to enhance the separation of fine particles with low terminal velocities. Rather than distributing the feed over a wide-cross section of the vessel, which simply leads to a high carry-over rate of fine particles, the novel approach embodied by aspects of the instant invention seeks to limit the horizontal distribution of the feed, seeking instead to minimize dispersion and trap the smaller particles either between the larger particles or in the hydrodynamic wakes of the larger particles. Thus, the smaller particles may be dragged down by the larger particles. Maintaining a high particle concentration within the inflow stream, combined with a low momentum flux, hinders the ability of fine particles to escape. The effectiveness of this approach is further enhanced by exploiting buoyancy forces which act on the inflowing slurry stream, causing it plunge aggressively upon entering the vessel, carrying the particles into the lower cone where densification occurs, with fine particles remaining entrapped within the high concentration of larger particles.

Generally, the present invention provides, in one aspect, a method of delivering feed, for example paraffinic solvent-treated bitumen froth, to a separation vessel, for example a froth separation unit (FSU). The feed is delivered from one or more side inlets that may be substantially normal to, and flush with, the wall of the vessel. In contrast to certain conventional feed systems used in gravity separators which use devices such as deflector plates, feed-wells or spargers, to widely distribute the feed across the vessel cross-section, the feed is delivered with low momentum such that it flows down the inside wall of the vessel rather than being broadly distributed over the vessel cross-section. This feed delivery is characterized by a side-inlet Richardson number of greater than 1.0, which may result in the formation of a single dense layer flowing along the bottom surface of the side-inlet which then plunges upon entering the vessel. A recirculating region of clarified fluid may form above the single dense layer flowing along the bottom of the side-inlet, reducing interfacial shear and thereby reducing fines release from the dense inflowing slurry. Such feed delivery is particularly useful where the feed has a distribution of particle sizes including both relatively large, rapidly settling, particles and relatively fine, slow settling, particles to be separated from an overflow stream. The gentle flow serves to mitigate the liberation of fine, slow settling, particles from the dense inflowing slurry stream, for example mineral solids, by being trapped between larger, faster settling particles, for example precipitated asphaltene aggregates.

As described below, data obtained from extensive physical modeling simulations of the actual PFT process show that the side entry delivery method consistently outperforms the conventional distributors such as a vertical pipe and deflector design.

In a first aspect, there is provided a method of delivering a feed, the feed comprising a liquid component and a solid component into a separation vessel for separating the liquid component from the solid component, the separation vessel having a side wall, the method comprising: flow conditioning the feed; and delivering the feed into the vessel through one or more side inlets in the side wall, wherein the feed is delivered with a side-inlet Richardson number equal to or greater than 1.0, to encourage smaller solid particles of the solid component to be incorporated into, or trapped within or under, or dragged down by, larger solid particles of the solid component and to be carried to an underflow.

Within this first aspect, the following embodiments may be included. The separation vessel may be a gravity separation vessel. The one or more side inlets may be fed by one or more pipes, respectively, the one or more pipes being substantially normal to the side wall of the separation vessel. The one or more side inlets may be fed by one or more pipes, respectively, the one or more pipes being substantially horizontal and of sufficient length to achieve flow conditioning of the feed to deliver the feed with a side-inlet Richardson number equal to or greater than 1.0 and resulting in the slurry flowing as a layer along the bottom of the inlet below a clarified liquid layer. The one or more pipes may be flush in their inlet cross-sections with the side wall of the separation vessel. The feed may be delivered with a side-inlet Richardson number equal to or greater than 2.0, or equal to or greater than 2.3. The feed may be a solvent-treated bitumen froth. The solvent may be a paraffinic solvent. The solid component may have a bi-modal size distribution. The solid component may comprise precipitated asphaltene aggregates and mineral solids. The feed may be delivered with a side-inlet Reynolds number in the range of 6,000 to 80,000 and with a vessel Reynolds number of 2,500 to 35,000. The feed may be delivered at a flux of 200 mm/min to 700 mm/min. The feed may be delivered using four inlets. Flow conditioning elements may be used for the flow conditioning. The flow conditioning elements may comprise a perforated sparger and a perforated plate, the perforated sparger being upstream of the perforated plate. In one embodiment, the feed is delivered with a side-inlet Richardson number of no more than 13.2.

In a second aspect, there is provided a feed delivery system for use with a froth separation unit, the system comprising: at least one feed delivery pipe for delivering and conditioning the feed; and a flow conditioning system, within the at least one pipe, for flow conditioning solvent-treated bitumen froth to a side-inlet Richardson number of equal to or greater than 1.0, the froth comprising bitumen, water, precipitated asphaltene aggregates, and mineral solids.

Within this second aspect, the following embodiments may be included. The flow conditioning system may comprise a perforated sparger and a perforated plate, the perforated sparger being upstream of the perforated plate. In one embodiment, the feed is delivered with a side-inlet Richardson number equal to or greater than 2.0 but not more than 13.2.

BRIEF DESCRIPTION OF THE DRAWINGS

Embodiments of the present invention will now be described, by way of example only, with reference to the attached Figures, wherein.

DESCRIPTION OF PREFERRED EMBODIMENTS

Figure 1:
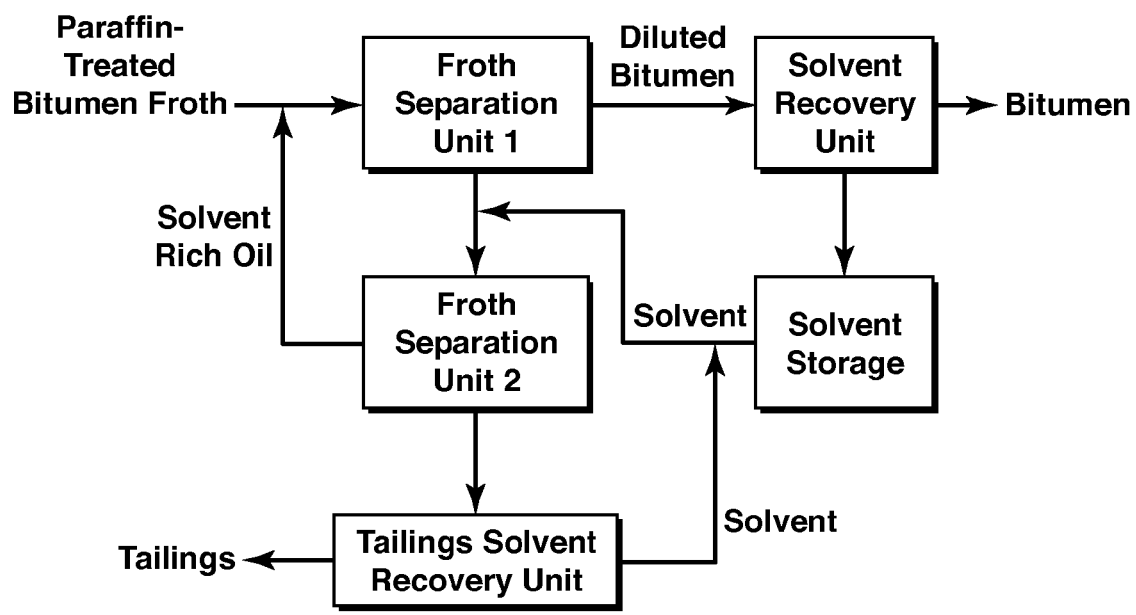
FIG. 1 is a flow diagram of a bitumen froth treatment process.

Myriad solid-liquid separation vessels such as gravity, filtration, etc. are known. Gravity separation can be further classified according to the magnitude of the gravity force involved in the separation. For example, a 1 G force separator is typically called a thickener/clarifier and cyclones and centrifuges are typical high G force separators. A typical thickener type of separator is characterized by a cylindrical upper section with a conical lower section to withdraw settled/separated solids from the process.

One class of separation vessels to which the instant feed delivery may be applied are gravity separation vessels. One sub-class of gravity separation vessels to which the instant feed delivery may be applied are froth separation units (FSUs) used to separate tailings and diluted bitumen from a bitumen froth feed. FSUs will be now be explained further.

Among several processes for bitumen or heavy oil extraction, the Clark Hot Water Extraction (CHWE) process represents a well-developed commercial recovery technique. In the CHWE process, mined oil sands are mixed with hot water to create a slurry suitable for extraction. Caustic is added to adjust the slurry pH to a desired level and thereby enhance the efficiency of the separation of bitumen. Recent industry developments have shown the feasibility of operating at lower temperatures and without caustic addition in the slurrying process. Air is added to the slurry comprising bitumen, water, and sand, forming a bitumen-rich froth.

Regardless of the type of water-based oil sand extraction process employed, the extraction process will typically result in the production of a bitumen froth product stream comprising bitumen, water and fine solids (also referred to as mineral solids) and a tailings stream consisting of essentially coarse solids and some fine solids and water. A typical composition of bitumen froth is about 60 wt % bitumen, 30 wt % water and 10 wt % solids, with some variations to account for the extraction processing conditions. The water and solids in the froth are considered as contaminants and must be either essentially eliminated or reduced, for instance, to a level suitable for feed to an oil refinery or an upgrading facility. The contaminants rejection process is known as a froth treatment process and is achieved by diluting the bitumen froth with a sufficient quantity of an organic solvent. The two major commercial approaches to reject the froth contaminants are naphtha solvent based and paraffinic solvent based. The paraffinic solvent route will now be described further.

Generally, a paraffinic froth treatment (PFT), for instance a high temperature paraffinic froth treatment (HTPFT) process may be used to produce clean bitumen that meets or exceeds pipeline quality specifications. In this process, bitumen froth and a paraffinic solvent are mixed together to produce diluted bitumen (dilbit), precipitated asphaltene aggregates (aggregates) and a small quantity of free water and free mineral solids. The paraffinic solvent is chosen such that is promotes the precipitation of asphaltenes. The aggregates are complex porous structures of varying size, comprising precipitated asphaltenes, fine minerals, water and solvent. When introduced into a froth separation unit (FSU) by gravity settling, the negatively buoyant aggregates, coarse minerals and water settle, leaving a clarified supernatant comprising of diluted bitumen plus ppmw (parts per million weight) levels of water and mineral solids. This cleaned, diluted bitumen product is removed from the FSU as an overflow stream.

The solvent in the diluted bitumen product is usually recovered to obtain a clean bitumen product which needs to be blended either with condensate or synthetic crude oil to meet pipeline transportation viscosity and density specifications. In addition, the condensate or synthetic crude blended bitumen should meet the solids specification, for instance 300 ppmw as measured by the filterable solids test (ASTM-D4807). The 300 ppmw in the pipeline blended product is equivalent to 130 ppmw solids in the diluted bitumen exiting the FSU.

An example of a PFT process is described below, where an example of the paraffinic solvent used to dilute the froth before gravity separation is a mixture of iso-pentane and n-pentane. The paraffinic solvent is added to the froth to reduce the bitumen density and viscosity, and to promote flocculation of the emulsified water and suspended solids. The term "paraffinic solvent" (also known as aliphatic) as used herein means solvents comprising normal paraffins, iso-paraffins, or a blend thereof, in an amount of greater than 50 wt %. Presence of other components such as olefins, aromatics or naphthenes counteract the function of the paraffinic solvent and hence should not be present more than 1 to 20 wt % combined and preferably, no more than 3 wt % is present. The paraffinic solvent may be a $C_4$ to $C_{20}$ paraffinic hydrocarbon solvent or any combination of iso and normal components thereof. In one embodiment, the paraffinic solvent comprises pentane, iso-pentane, or a combination thereof. In one embodiment, the paraffinic solvent comprises about 60 wt % pentane and about 40 wt % iso-pentane, with none or less than 20 wt % of the counteracting components referred above.

PFT differs from the other commercial bitumen separation process called naphthenic froth treatment (NFT) where the froth is diluted with naphtha to decrease the density and viscosity of the bitumen and to promote coalescence of emulsified water. In NFT, phase separation is achieved with gravity separation followed by centrifuging. The separation vessel of the PFT process is a gravity settler.

An example of a PFT process will now be described with reference to FIG. 1. A bitumen froth (having paraffinic solvent therein) is fed to an FSU where gravity separation is used to separate diluted bitumen from tailings. In FIG. 1, two FSUs (FSU-1 and FSU-2) are used. In FSU-1, the froth is mixed with a solvent-rich oil stream from FSU-2. The temperature of FSU-1 is maintained at about 60 to 80° C., or about 70° C. and the target solvent to bitumen ratio is about 1.4:1 to 2.2:1 by weight or about 1.6:1 by weight. The overflow from FSU-1 is the diluted bitumen product and the bottom stream from FSU-1 is the tailings comprising water, solids (inorganics), precipitated asphaltene aggregates, and some residual bitumen. The residual bitumen from this bottom stream is further extracted in FSU-2 by contacting it with fresh solvent, for example in a 25:1 to 30:1 by weight solvent to bitumen ratio at, for instance, 80 to 100° C., or about 90° C. The solvent-rich overflow from FSU-2 is mixed with the fresh froth feed as mentioned above. The bottom stream from FSU-2 is the tailings comprising solids, water, precipitated asphaltene aggregates, and residual solvent. Residual solvent is recovered prior to the disposal of the tailings in the tailings ponds. Such recovery is effected, for instance, using a tailings solvent recovery unit (TSRU), a series of TSRUs, or by another recovery method. Examples of operating pressures of FSU-1 and FSU-2 are respectively 550 kPag (kilopascal gauge) and 600 kPag. A solvent recovery unit (SRU) is used to recover solvent from the diluted bitumen exiting FSU-1. The foregoing is only an example of a PFT process.

Extensive tests at commercial process conditions were carried out in a relatively small pilot FSU using bitumen froth obtained from a commercial mine operation. This small pilot from hereon is refereed to as "hot pilot". These experiments showed that the precipitated asphaltene aggregates could be successfully removed from the diluted bitumen while also meeting the required specifications with regard to mineral solids carry-over concentrations in the product overflow stream. The term "carry-over" also synonymous with filterable solids in the product. The hot pilot FSU is a 100 mm diameter by 1690 mm tall vessel, with a perimeter overflow weir located at the top of the vessel and a conical section located at the bottom of the vessel. The bitumen froth/solvent blend was introduced into the hot pilot FSU through a half inch diameter side-wall port located approximately at the mid-height of the vessel. Clarified diluted bitumen flowed over the upper weir while the asphaltene aggregates, water, mineral solids, and residual solvent flowed out the bottom of the vessel through a 60 degree cone. Analysis of the data obtained from the hot pilot FSU indicated that this high mineral separation efficiency was achieved because most of the mineral solids were either directly incorporated into the precipitated asphaltene aggregates or were trapped between precipitated asphaltene aggregates and carried to the underflow ("scavenged"). In these experiments, the mineral solids content in the overflow stream was found to increase from approximately 75 ppmw at an upward flux of 200 mm/min to approximately 78 ppmw at an upward flux of 250 mm/min. In these experiments, direct measurement of the actual size (diameter) of the precipitated asphaltene aggregates or the filterable mineral solids was not possible.

Scale up of the process from the 100 mm diameter hot pilot vessel with a volumetric flow rate of 0.118 m³/hr, to a more commercially viable volumetric flow rate of 1357 m³/hr for example, represents a 11,500 times increase in volumetric throughput. The construction of 11,500 100 mm diameter vessels is clearly impractical and therefore commercialization requires the scale-up to a larger vessel. A direct geometric scale-up of the hot pilot vessel to commercial scale would require a 9.6 m diameter by 162.24 m high vessel, which is quite impractical. A change in both vessel geometry and vessel size, is useful for commercial success. The increase in vessel diameter for 100 mm to 9.6 m, changes the fundamental flow characteristics from low Reynolds number laminar flow to turbulent flow, and the change in vessel shape significantly alters the flow distribution within the vessel. Reducing the height to width ratio of the vessel, and increasing the Reynolds number, are both detrimental to separation efficiency.

Figure 2A:
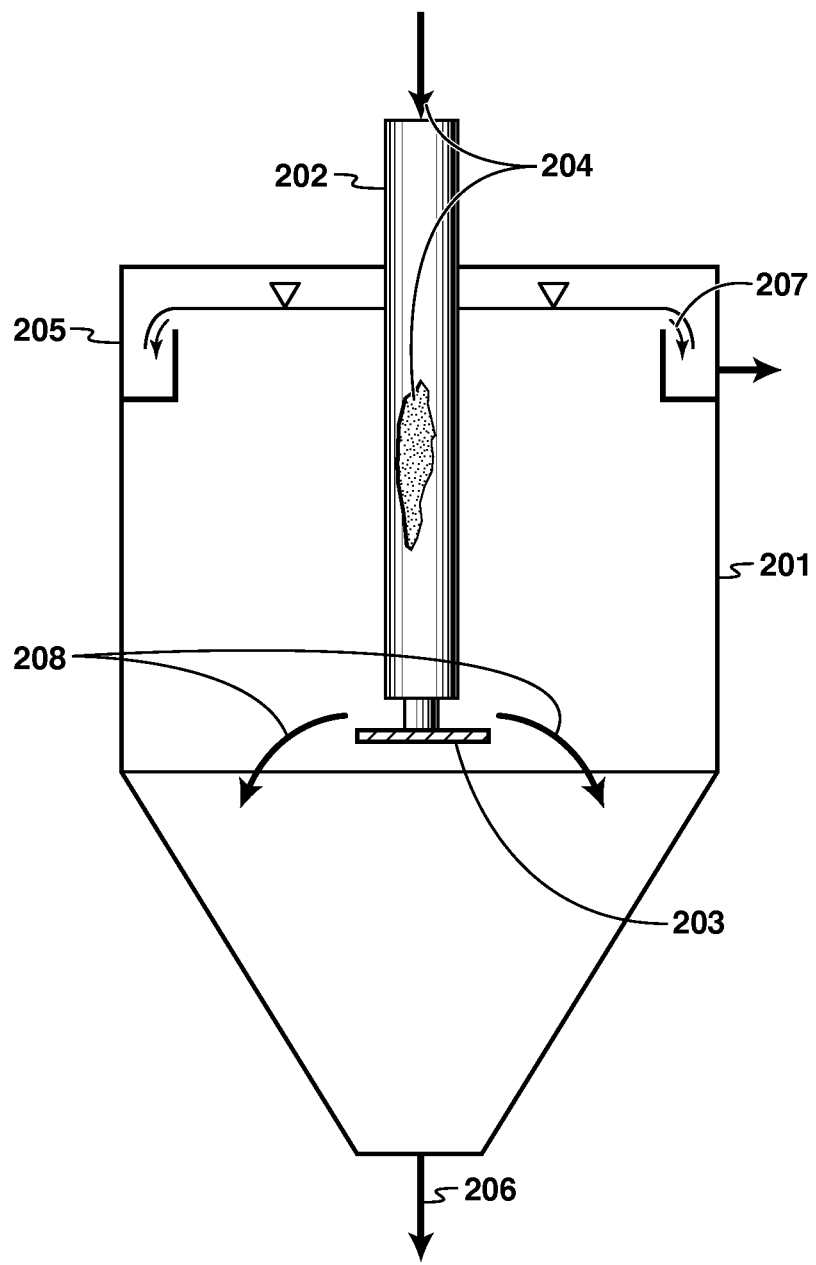
FIG. 2A is a schematic of a feed delivery arrangement using a deflector plate.
Figure 2B:
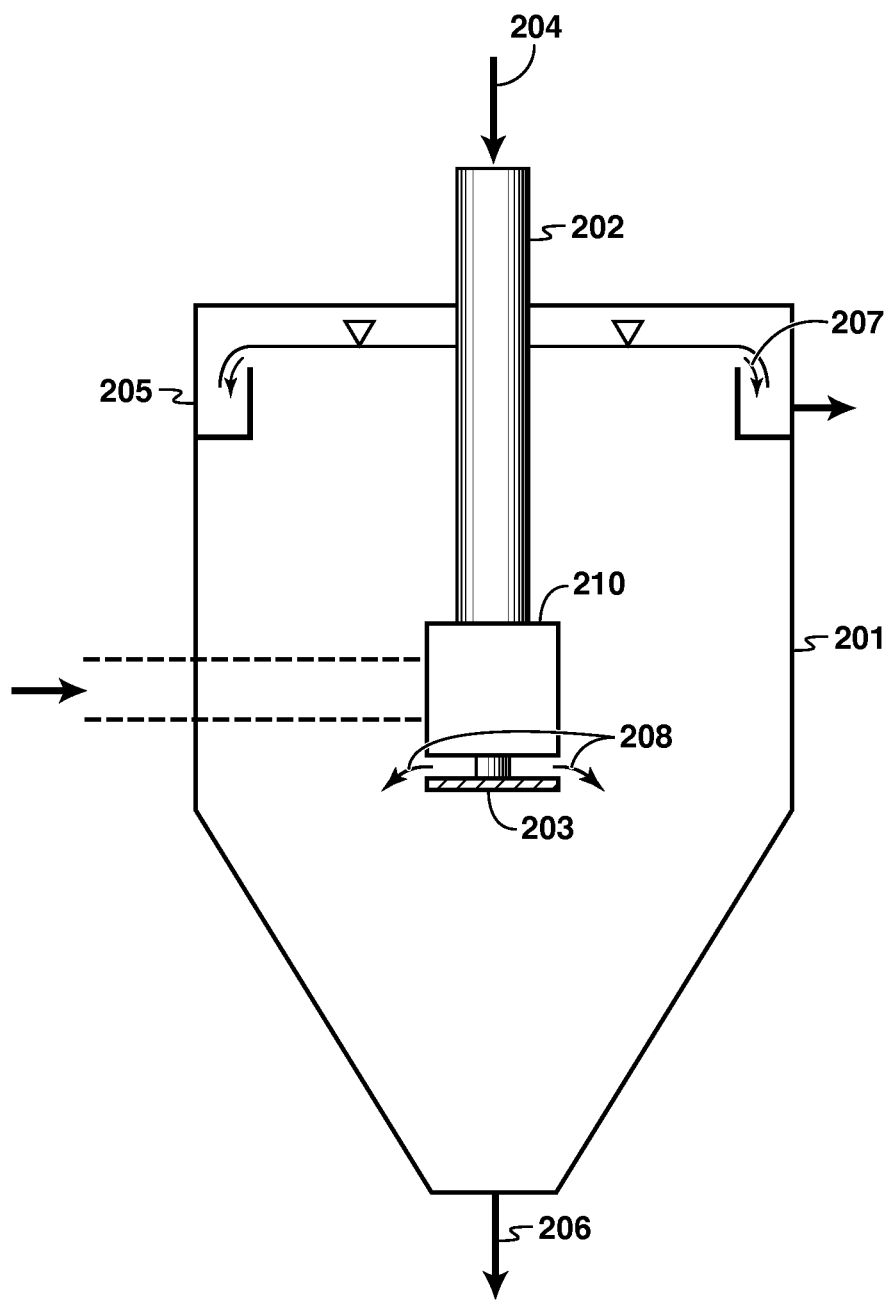
FIG. 2B is a schematic of a feed delivery arrangement using a feed well and a deflector plate, showing both top and side configurations.
Figure 2C:
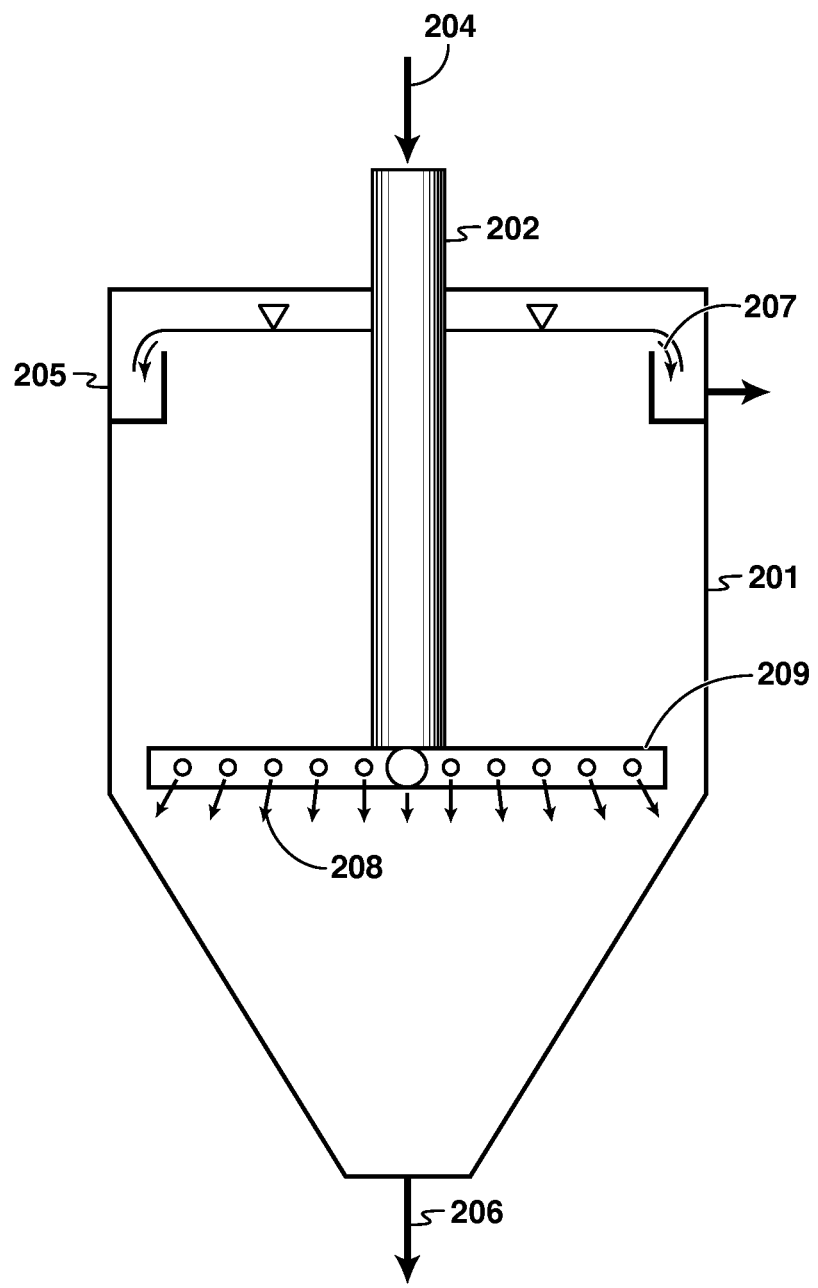
FIG. 2C is a schematic of a feed delivery arrangement using a multi-arm sparger configuration.

A PFT gravity settler, with a three different feed delivery systems is shown in FIG. 2A, FIG. 2B and FIG. 2C. In FIG. 2A, a slurry (204) is introduced to the settler vessel (201) by means of a vertical pipe (202) penetrating down through the top of the vessel. In order to re-direct the momentum of the incoming slurry and to distribute (208) the slurry over the cross-section of the vessel, a deflector plate (203) is attached below the exit of the vertical pipe. Precipitated asphaltene aggregates and large mineral solids settle downwards by gravity and are withdrawn from the bottom of the vessel (206). The clarified liquid product (207) overflows into a launder device (205) and reports to further downstream processing. The launder device (205) is a trough internal to the settler bounded by an overflow weir, across which clarified product is allowed to pass. In FIG. 2B, a slurry (204) is introduced into the settler vessel (201) by means of a horizontal pipe (202) discharging into a central feed-well (210) which reduces the momentum of the inflow and than distributed the slurry into the vessel through a single opening, or multiple openings, in the bottom of the feed-well. A deflector plate (203) may or may not be used in combination with a feed-well distributor to distribute (208) the feed. The launder device (205), withdrawal through the bottom of the vessel (206), and clarified liquid product (207) are also shown. In FIG. 2C, a slurry (204) is introduced into the settler vessel (201) by means of a vertical pipe (202) and sparger (209) comprising of a series of perforated pipes to insure good distribution (208). The launder device (205), withdrawal through the bottom of the vessel (206), and clarified liquid product (207) are also shown. In all three of these conventional designs the goals are to produce a uniform upward velocity distribution and to distribute the particles over the vessel cross-section.

One embodiment of the instant invention relates to the manner by which a solvent-treated/mixed bitumen froth is fed into an FSU for separation. One goal is to obtain good separation of solvent diluted bitumen from mineral solids and precipitated asphaltene aggregates at good or target throughput. Optimization of the feed delivery system may offer an opportunity to increase throughput and/or reduce capital investment with smaller or fewer settling vessels.

Figure 3:
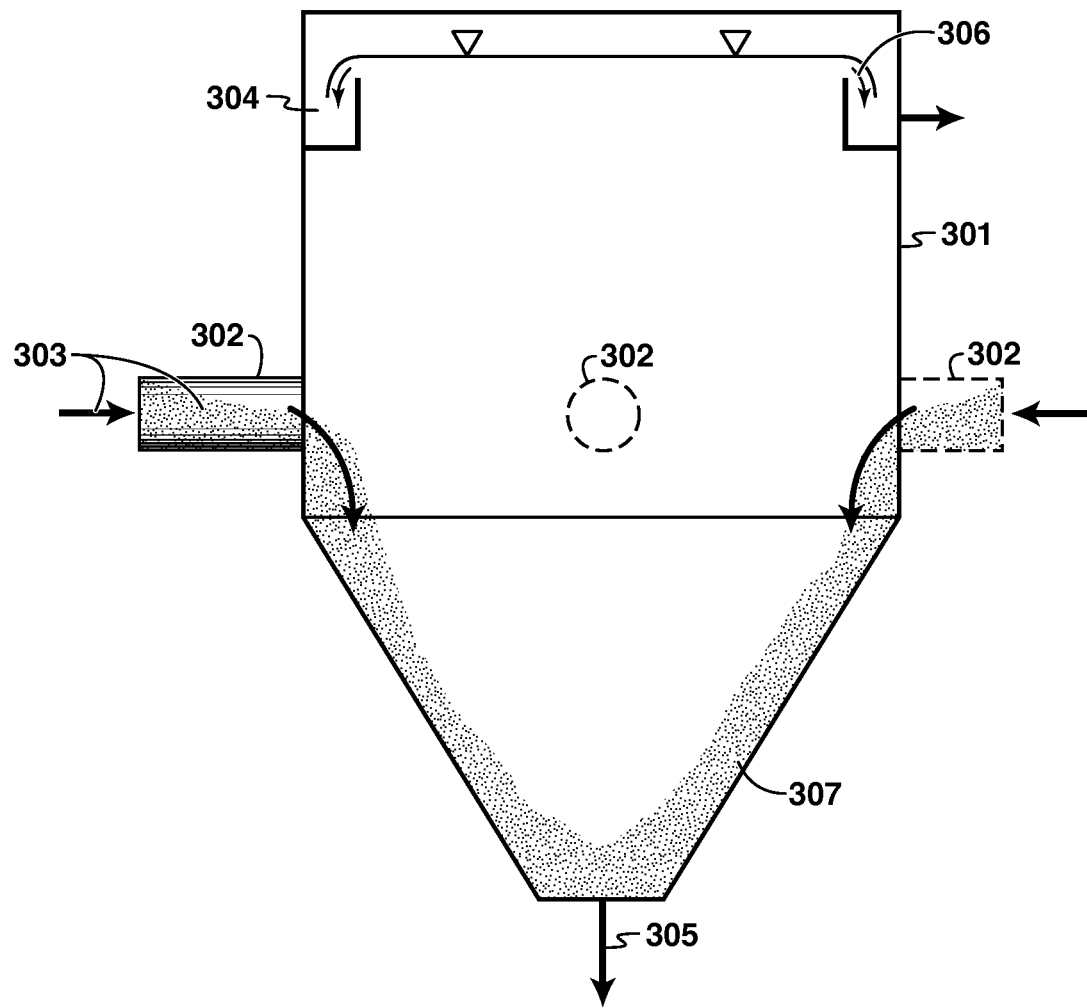
FIG. 3 is a schematic of a gravity settler with a side-entry feed delivery system in accordance with a disclosed embodiment illustrating the flow distribution within the side-inlet and the separation vessel.

One embodiment provides a method of feed delivery to a separation vessel for the removal of particulates/flocculants from paraffinic solvent treated bitumen froth. Of course, throughout this specification, terms such as "removal" as relating to separation do not imply 100 percent removal, and the extent of removal desired will depend on the particular application and desired operating parameters. This feed delivery method can be applied to conventional settler vessels of the type commonly employed by the mineral processing and oil sands industries, among others. An example of a conventional FSU is shown in FIGS. 2A, 2B, and 2C having a round vessel with conical bottom section, and internal overflow launder. Whereas a conventional feed delivery system may consist of a vertical pipe with a deflector plate (FIG. 2A), feed-well (FIG. 2B) or sparger (FIG. 2C), this embodiment comprises one or more horizontal pipes entering the vessel normal and flush from the side (FIG. 3). Based on physical modeling results, this arrangement is shown to offer superior separation performance when compared with conventional vertical pipe/deflector plate designs. Physical modeling is a proven scale up technique designed to simulate the process and materials involved in the commercial process using scale models and surrogate materials of the pilot and commercial units. Such physical model testing is also referred to as cold flow testing because it is often performed at room temperature condition. Data obtained from extensive physical modeling simulations of the actual PFT process show that the side entry delivery method consistently outperforms the conventional distributors such as a vertical pipe and deflector design.

An example of an FSU using a conventional centrally located feed distributor is a 9.6 m diameter cylindrical vessel, having an internal perimeter overflow weir and launder, a bottom conical section and the centrally located feed distributor. A bitumen froth plus solvent feed injection rate could be 1357 m$^3$/hr with a flow split of approximately 80% volume overflow and 20% volume underflow, giving a nominal upward flux of about 250 mm/min. The target maximum solids specification may be, for instance, 200 ppmw or 130 ppmw. A solids separation efficiency of over 99.8% may be desired to meet a 130 ppmw solids specification, based on the composition of certain oil sands leases located in northern Alberta, Canada. These values are merely provided by way of example.

During cold flow testing described below, a physical model and analogue materials to represent the precipitated asphaltene aggregates, mineral solids, and diluted bitumen, and water, were used to evaluate and optimize feed distribution systems. Experiments were performed in a 1:1 scale model of the hot pilot FSU using spherical glass beads to represent various possible distributions of precipitated asphaltene aggregates and mineral solids in the hot pilot FSU. By combining the mineral solids carry-over data from the hot pilot FSU overflow stream with the grade carry-over curves determined in the cold flow pilot FSU and data from batch hindered settling experiments, it was possible to develop a very good estimate of the size distribution of mineral solids and asphaltene aggregates. On the basis of this work, it was concluded that the solid particles entering the hot pilot FSU consisted of a high mass fraction of relatively large precipitated asphaltene aggregates and a low mass fraction of free mineral solids. The size distribution of the aggregates was approximately Gaussian (in part based on an optical measurement technique), the d50 was about 600 microns, the average terminal velocity was about 2700 mm/min, and the hindered settling velocity was about 1350 mm/min (at a solids volume fraction of 12% vol and a Richardson Zaki coefficient of 5.4). Although the exact size distribution of free mineral solids was not determined, it was estimated that about 2% of the total mineral solids entering the separator were free mineral solids, with terminal velocities between 0 and 1350 mm/min. It was also estimated that approximately 60% of these free mineral solids had terminal velocities below 200 mm/min, and the remaining 40% had terminal velocities relatively uniformly distributed between 200 mm/min and 1350 mm/min. The overall particle size distribution was therefore bi-modal in shape, with a relatively uniform and low concentration of mineral solids between the lower and upper peaks.

Side-Inlet Design

Figure 7:
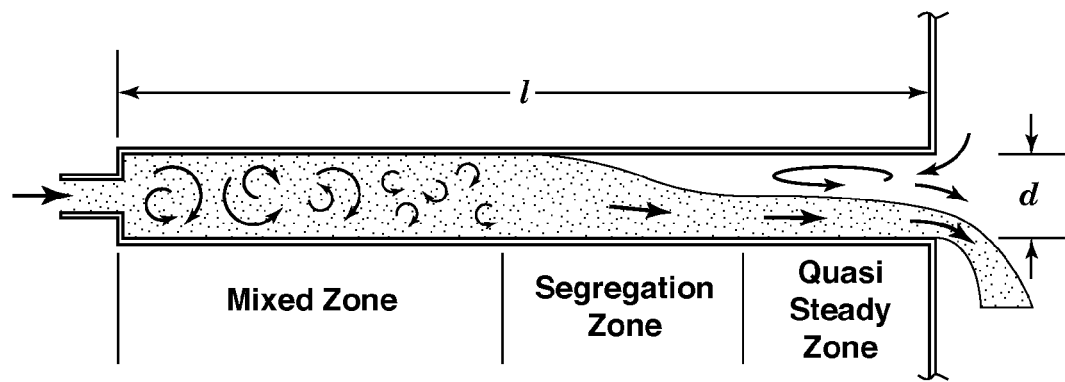
FIG. 7 is a schematic of flow distribution in an l/d=10 side-inlet.

In one embodiment, it is desirable have a feed delivery design that induces solids segregation and flow conditioning prior to discharging into the vessel. One option is to have an elongated side-inlet discharging into the vessel through the vessel side-wall. This design was constructed to deliver feed to a physical model simulating a commercial FSU, also referred to as commercial FSU model. As illustrated in FIG. 7, the diameter of the side-inlet was selected to reduce the velocity of the slurry to a sufficient degree that the slurry would flow along the bottom of the pipe as a well defined layer with clarified fluid above. The length of this side-inlet was selected to be sufficiently long to ensure that the flow disturbances produced at the entry point into the side-inlet had dissipated, and that the flow distribution had become invariant as it approached the end of the side-inlet located at the side wall of the vessel. Some of the other potential strengths of this concept may include the ability to control the inlet Reynolds number, momentum flux, and Richardson number, by adjusting the number of inlets and the inlet diameter(s), mitigated blockage of vessel cross-sectional area, simplicity, relatively low cost, and a relatively low risk of fouling.

Figure 8:
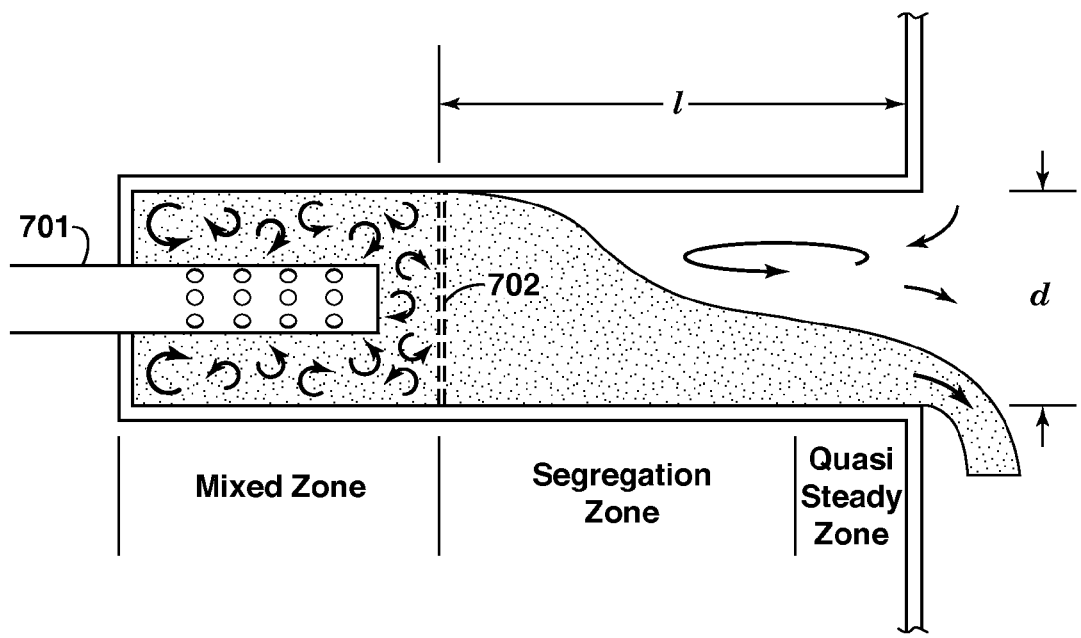
FIG. 8 is a schematic of flow distribution in an l/d=2.5 side-inlet with flow conditioning elements (sparger and perforated plate)
Figure 9:
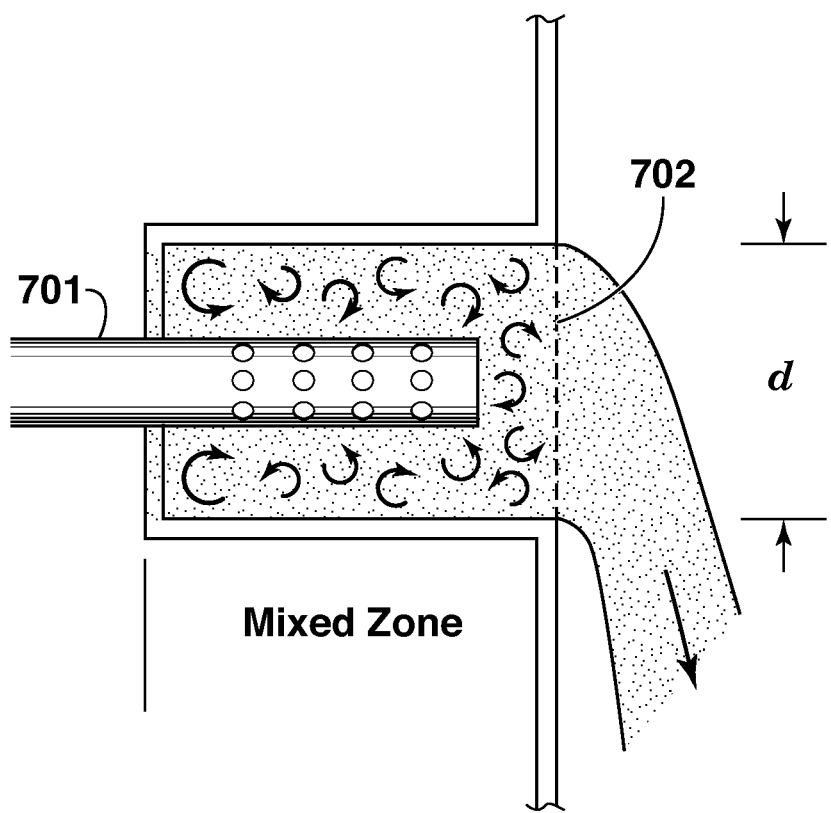
FIG. 9 is a schematic of flow distribution in an l/d=0.0 side-inlet with flow conditioning elements (sparger and perforated plate).

One design is a simple long side-inlet having a length to diameter ratio of ten (l/d=10), where l is the side-inlet length and d is the side-inlet diameter, located at the mid-height of the L/D=1.2 cylindrical section of the commercial FSU model, where L is the height of the cylindrical section and D is the diameter of the cylindrical section. This design yielded a separation efficiency improvement of approximately 25% for mineral solids having $U_t/U_s<1.0$, where $U_t$ is the particle terminal velocity and $U_s$ is the average (superficial) upward velocity in the cylindrical section, compared to the previously tested conventional designs. While this side-inlet design was a success with respect to separation efficiency, it was relatively unattractive, though not unworkable, in terms of direct commercial implementation due to its length and the substantial support structure that would be required. If this design was scaled geometrically for a 9.6 m commercial vessel, it would be 12.2 m in length and 1.22 m in diameter. Given this concern, the length of the side-inlet length was reduced and flow conditioning elements were added to induce a more rapid transition to the axially invariant flow distribution observed in the l/d=10 side-inlet. These elements were a perforated sparger followed by a perforated plate. As illustrated in FIG. 8, the sparger (701) and perforated plate (702) reduce the inlet momentum and cause the flow to redistribute such that the flow is relatively uniform just downstream of the perforated plate. The perforated plate also eliminates large and medium scale turbulence, which are slow to dissipate, thereby reducing the time and distance required for the single layer flow to occur and to become axially invariant. At this reduced superficial velocity, the slurry segregates toward the bottom of the pipe, forming a layer which flows along the bottom of the pipe. The thickness of this layer is governed by a Froude number control condition at the end of the side-inlet. A recirculating clarified fluid layer forms above the dense inflowing layer, minimizing shear stress along the upper surface of the in-flowing dense slurry layer. The reduction of shear stress along this surface reduces entrainment of fine particles into the clarified liquid within both the side-inlet and within the vessel. Alternative conditioners such as vanes, baffles, etc., could have been user rather than the perforated plate to cause the more rapid transition to stable single layer flow. Using the flow conditioning elements described above, it was found that that length to diameter ratio (l/d) of the side inlet (between the perforated plate and the vessel wall) could be reduced to 2.5 to achieve similar performance to that achieved by the original l/d=10 side-inlet. FIG. 9 illustrates the flow distribution that is obtained when the perforated plate is located at the wall of the vessel and the l/d of the side-inlet is reduced to zero. This geometry provides improved performance compared to a conventional design, but is less effective compared to the embodiment of l/d=2.5. Compared to the performance with l/d=2.5, the performance in the range of 0<l/d<0.75 was 20% poorer and in the range of 0.75<l/d<2.2, the performance was 45% poorer. In one embodiment, the l/d is in the range of 2.2 to 3.0. In one embodiment, the l/d is in the range of 2.2 to 10. In one embodiment, the l/d is in the range of 0 to 10, or greater.

Multiple Side-Inlet Design

In another design, to operate at a reduced Reynolds number, the single side-inlet was replaced with four slightly smaller diameter side-inlets arranged with ninety degrees between each inlet, reducing the Reynolds number by a factor of about 3. This configuration was found to provide a further improvement over the single inlet configuration. A parametric study was then performed in which the number of side inlets was varied, (including 1, 2, 4, and 8), the side-inlet diameter was varied (75 mm, 100 mm, 150 mm, and 200 mm), the flow rate was varied by a factor of 3.5 from simulating 200 mm/min at commercial scale to 700 mm/min at commercial scale, and the elevation of the side-inlet above the tangent line was also varied. These tests revealed that the performance of the side-inlet design was relatively independent over the parameter ranges tested, with the exception of side-inlet elevation. In one embodiment, the side inlet is positioned in the range of 0.5 D to 0.7 D above the tangent line between the cylindrical section and the conical section.

In order to better understand and characterize the flow distribution in the side-inlets a series of studies were performed using salt water solution to simulate the dense slurry stream and fresh water to simulate the clarified liquid. Flow visualization was used to gain insight into the characteristics of the dense layer flowing along the bottom of the side-inlet and the trajectory of the discharge plume entering the vessel. Data from these experiments revealed that the high degree of design robustness with respect to flow rate was related to the existence of a Froude number control condition at the discharge end of the pipe which controlled the velocity and thickness of the discharge layer. As the flow rate was changed, the thickness and velocity of the densified layer would adjust such that both the discharge Froude number and the discharge trajectory of the plume entering the vessel remained relatively constant over a very wide range of flow rates (or side-inlet Richardson numbers). As the flow rate was reduced, the layer velocity would reduce (reducing the horizontal velocity) and the layer thickness would reduce (reducing the vertical plunging velocity) resulting in a similar discharge angle.

One desirable design would have a side-inlet Richardson number of approximately 4 as this resulted in a relatively small side-inlet diameter, while still providing for a doubling of throughput (which would reduce the side-inlet Richardson number to 2, which is still within the proven parameter range). Four side-inlets were selected as a preferred design as this avoided the large inlet sizes required to achieve a side-inlet Richardson number of 4 with two inlets, while also avoiding the more complex delivery piping arrangement required with eight inlets.

In one embodiment, the pipes feeding the vessel are normal to the vessel side wall. However, this is primarily desired where the vessel side wall is vertical and thus the pipes are horizontal. Therefore, in a case where the vessel side wall is not vertical, the pipes may be horizontal and therefore not normal to the walls. The inlet pipes need not be precisely horizontal. Having horizontal pipes, rather than downward sloping pipes, improves the stability of the interface between the single layer slurry flow and the clarified liquid above, thereby limiting interfacial entrainment which increases fines particle retention in the dense slurry layer. Upward sloping pipes are generally not preferred due to their increased susceptibility to sanding.

The expression "flow conditioning" is defined herein as a means by which a side-inlet Richardson number equal to or greater than 1.0 is used in combination with specific side-inlet geometries to produce a desirable "flow condition". Examples described above include using a long side inlet pipe, and/or using flow conditioning elements such as a perforated sparger and a perforated plate.

Performance Validation at Increased Reynolds Number

Although the 1:8 scale commercial model appeared to exhibit Reynolds number independence, there was still concern that the higher inlet Reynolds number anticipated at commercial scale could lead to diminished performance that was not adequately represented in the 1:8 model. Two steps were taken to address this concern. First, the water temperature in the 1:8 scale commercial FSU model was increased, which doubled the Reynolds number to more closely match the commercial Reynolds number, and second, a larger 1:4 scale model was fabricated to allow commercial Reynolds numbers to be matched in the model when operating at 50° C. In order to maintain similarity with commercial conditions when operating at 50° C., the size distribution of the glass beads and the volumetric flow rates used in the models were adjusted accordingly.

The assumption of relative Reynolds number independence was supported by the fact that the performance of the 1:8 model was virtually the same at both 20° C. and 50° C. using the original particles. This conclusion was further supported by the fact that virtually identical grade carryover curves were obtained in the 1:4 and 1:8 scale models operating at 50° C. with the new particle set. These results showed that the enhanced separation efficiency achieved with the side-inlet feed distribution design could be obtained over a vessel Reynolds number range of 2,500 to 35,000, and a side-inlet Reynolds number range of 6,000 through 80,000. Operation outside of these ranges is also contemplated, including where different slurries or other conditions are changed. Experimental data obtained in the 1:8 model and the 1:4 model indicate that Reynolds number independence was achieved in the simulations, and therefore comparable performance is anticipated for a side-inlet Reynolds number above 80,000 and a vessel Reynolds number above 35,000.

Design Refinement and Optimization

The overall robustness and stability of the side-inlet design was evaluated. Each of the following attributes were tested:

Stability: Two long duration tests were performed, one for a period of 36 hours and the other for a period of 22 hours. These tests indicated that steady-state operation was achieved in the 1:4 scale wedge model of the commercial FSU after a period of approximately 10 hours (or about 30 residence times).

Solids Loading: The grade separation efficiency was evaluated at a reduced solids loading of 9% by volume. The performance at 9% loading was found to be similar to the performance obtained with the nominal 12% loading. Solids loadings beyond 12% were not simulated in the physical model due to the maximum packing fraction limit associated with solids spheres at the 80%-20% flow split.

Side-Inlet Length: A range of side-inlet lengths were evaluated and it was determined that l/d=2.5 or greater provided preferred performance. Compared to the l/d=2.5 geometry, the separation efficiency was about 20% reduced in the range of 0.0<l/d<1.75 and 45% reduced in the range of 1.75<l/d<2.2. One embodiment is between 2.2 and 3.0, or about 2.5.

Increasing Upward Flux: The upward flux was increased from simulating the nominal condition of 250 mm/min and side-inlet Richardson number of 4.0, to simulate an upward flux of 400 mm/min and a side-inlet Richardson number of 2.5. The results of these experiments indicated only a very slight increase in mineral solids carry-over. Data was also obtained in the smaller 1:8 scale model which indicated that acceptable performance could be achieved at an upward commercial flux of 700 mm/min, which is over 50% of the hindered settling velocity of the d50 (600 micron) precipitated asphaltene aggregates. Operation outside of this flux range is also contemplated, including where different slurries or other conditions are changed.

Sensitivity to Tangent Line Profile Shape: Experiments showed that changing the vessel profile shape at the tangent line between the cylindrical and conical sections from an abrupt transition to a smooth transition over a 2.8 m region extending above and below the tangent line elevation had no significant impact on separation efficiency.

One design example is as follows:

Cylindrical section length to diameter ratio: 0.6<L/D<2.0, or 1.0<L/D<1.4, or about L/D=1.2. Side-inlet length to diameter ratio: 0.0<l/d<1.75 or l/d>2.2, or 2.2<l/d<3.0, or about l/d=2.5. Side-inlet Richardson number: Ri>1.0, or 1.0<Ri<13.2, or 2.0<Ri<6.0, or about Ri=4.0. Number of inlets: 1<N=8, or 4<N<6, or N=4. Side-inlet positioned above tangent line: 0.2 D to 0.7 D, or 0.5 D to 0.7 D, or about 0.6 D.

On the basis of the most conservative data sets the predicted mineral solids carry-over in a commercial FSU with this design are 88 ppmw at a commercial flux of 250 mm/min, and 93 ppmw at a commercial flux of 400 mm/min. These values are approximately 70% of the maximum specification of 130 ppmw solids carry-over.

In addition to exceeding the solids carry-over specifications by approximately 30%, this design has other potential design strengths. These include:

Robust Design: The side-inlet geometry has shown itself to be very robust, with relatively little sensitivity to flux and geometry modifications (Reynolds, number of inlets, etc.).

Simplicity/Low Cost: The design is simple, minimizing fabrication, installation and maintenance costs.

Low Maintenance: There is limited risk of fouling with this design given that (a) there are preferably no vessel internals to foul and (b) only the upper surface of the inlet pipe just down stream of the perforated plate will experience high hydrocarbon concentrations.

FIG. 3 shows one embodiment. A gravity settler vessel (301) is shown including a cylindrical section attached to a lower cone. A slurry (303) is pumped into the vessel via one or more horizontal (side) inlet pipes (302) attached flush to the vessel wall (i.e., preferably they do not penetrate into the vessel). The inflowing slurry stream, being of greater density than the bulk contents of the vessel, forms a moving layer having a thickness which is less than the pipe diameter, with ingress of clarified fluid from the vessel present above the flowing layer. The layer thickness is determined by a Froude number control condition at the wall of the vessel. The dense slurry stream (307) then plunges aggressively once it enters the vessel, falling downward adjacent to the vessel side wall. Further densification occurs as the streams enter the bottom cone, with clarified liquid product being released. The particles in the densified slurry are withdrawn from the bottom of the vessel (305). The clarified liquid product (306) flows in the usual manner through a launder device (304) and reports to further downstream processing.

Further Validation of Embodiments of the Instant Invention

A wide range of feed distributors were evaluated using a dynamically scaled physical model. These designs included conventional deflector plates, diffusers plus deflectors plates, single and multiple nozzle arrays (including a range of diameters oriented both vertically and horizontally) and internal partitions. The test work was performed at Coanda Research & Development Corporation in Burnaby, British Columbia, Canada. The cold flow model used water and glass beads as a surrogate for the asphaltene/diluted bitumen system. The typical metric for performance evaluation of particulate separation devices is a grade carry-over curve as displayed in FIG. 4. This quantifies the separation efficiency as a function of particle size (or grade). Grade carry-over curves were obtained from the laboratory model by accurately measuring the mass flow and particle size distributions at the inlet an the overflow, and then calculating the separation efficiency as a function of particle size. By convention, grade carry-over is reported as a function of particle terminal velocity ($u_t$) normalized by the superficial velocity (upward flux) ($u_s$) lower values of the grade carry-over curve are desirable as they indicate better performance. For example, a grade carry-over value of zero would indicate complete capture, while grade carry-over value of one would indicate total loss of a particular sized particle. In general, an increasing ratio of $u_t/u_s$ (402) indicates larger particles. The $u_t/u_s$ scaling was adopted as a convenient way to compare grade efficiency curves measured at different vessel throughput and/or different fluid/solids properties. Thus, the grade curves depicted in FIG. 4 indicate that fine particles are more difficult to capture, while the larger particles tend to settle out with relative ease.

Figure 4:
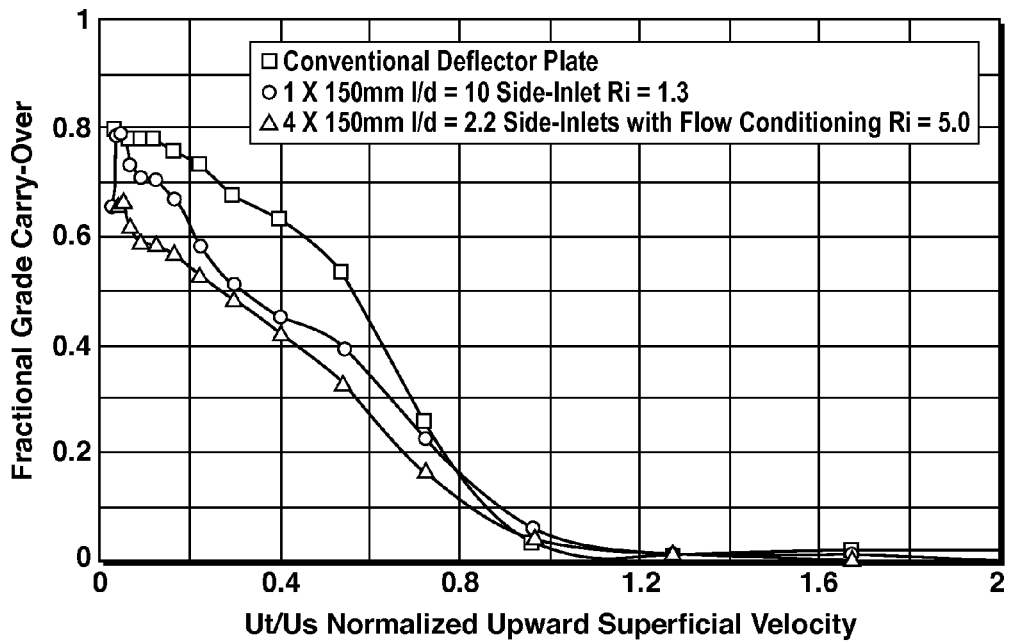
FIG. 4 is a graph showing separation efficiency of a conventional deflector plate design, an l/d=10 side-inlet, and four side-inlets with internal flow conditioning.

FIG. 4 compares three typical grade efficiency curves obtained in the laboratory for a conventional delivery configuration, a single long side-inlet delivery configuration with l/d=10 and a four side-inlet delivery configuration. Below about $u_t/u_s=1$, the side entry configurations are clearly superior as indicated by the reduced grade-carry over, with the four side-inlet configuration being superior to the single side-inlet configuration. This difference is considered significant, as the left hand side of the grade curve corresponds to the material which contributes most strongly to the product filterable solids. As discussed below, when side entry is combined with additional feed parameters, performance can be further improved.

Dimensional analysis was carried out for the settler system. The three most important dimensionless groups influencing settler performance are the Stokes number, Reynolds number, and Richardson number. The Stokes number characterizes the particle terminal velocity relative to the vessel superficial velocity, the Reynolds number is related to turbulence scales and the Richardson number characterizes the buoyancy characteristics of the flow. In context with the side-inlet configuration the Richardson number is best defined in terms of the side-inlet, where the magnitude of the side-inlet Richardson number is related to the formation of a segregated single layer flow in the side-inlet, and in combination with d/D determines the relative trajectory of the plunging flow. Higher values of the side-inlet Richardson number result in the formation of a thinner layer in the side-inlet. Mathematically, the side-inlet Richardson number is defined as the ratio of characteristic downwardly directed buoyancy velocity to the characteristic horizontally directed inlet velocity, or in symbols:

$$Ri = \frac{\sqrt{d(\rho_{slurry} - \rho_{fluid})g/\rho_{fluid}}}{u}$$

Where d is the side-inlet diameter, $\rho_{slurry}$ is the bulk density of the inflowing slurry, $\rho_{fluid}$ is the density of the clarified overflow, g is the gravitational constant (9.81 m/s²) and u is the superficial velocity in the side-inlet pipe.

Figure 5:
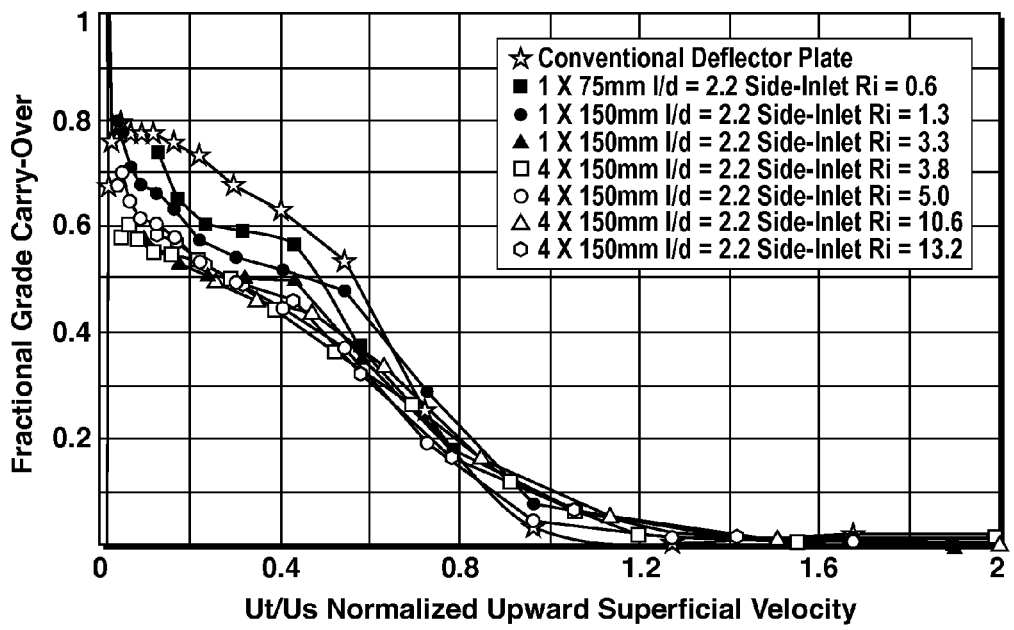
FIG. 5 is a graph showing separation efficiency of a side-entry design with varying inlet Richardson numbers and varying numbers of side-inlets, compared to a conventional deflector plate design.

In general, side-inlet Richardson numbers greater than unity imply flows that form a segregated layer on the bottom of the side-inlet and which plunge more aggressively upon entering the vessel. For fixed material properties, it is possible to vary the side-inlet Richardson number in the laboratory by either varying the throughput or changing the number and size of inlets. In this work, both approaches have been adopted, and a range of side-inlet Richardson numbers has been identified which maximize the potential settler efficiency. FIG. 5 illustrates four experiments where the side-inlet Richardson number was systematically decreased by increasing the vessel throughput for a constant geometry. In this case, the geometry tested was 4×150 mm i.d. inlets installed in the 1:8 scale model distributed at 0, 90, 180, and 270 degrees in the azimuthal direction. The flow rate was selected to simulate commercial superficial vessel fluxes of 200, 250, 450, and 700 mm/min, corresponding to side-inlet Richardson numbers of 13.2, 10.6, 5.0, and 3.8, respectively. The grade carry-over curves were observed to be very similar in all three cases.

The influence of the number of inlets was evaluated by measuring the performance with one inlet and four inlets operating at various flux rates as set out in Table 1.

TABLE 1

Test conditions to compare the performance of one side inlet to four side-inlets.

| Number of Inlets | Inlet Diameter [mm] | Richardson Number |
| --- | --- | --- |
| 1 | 75 | 0.6 |
| 1 | 150 | 1.3 |
| 1 | 150 | 3.3 |
| 4 | 150 | 3.8 |
| 4 | 150 | 5.0 |
| 4 | 150 | 10.6 |
| 4 | 150 | 13.2 |

Results are depicted in FIG. 5. Consistent performance is observed between the case of one inlet compared to four inlets at comparable inlet Richardson numbers. Diminished performance is observed as the inlet Richardson is decreased to 1.3, and a further reduction in performance is observed as the inlet Richardson number is further reduced to 0.6.

Figure 6:
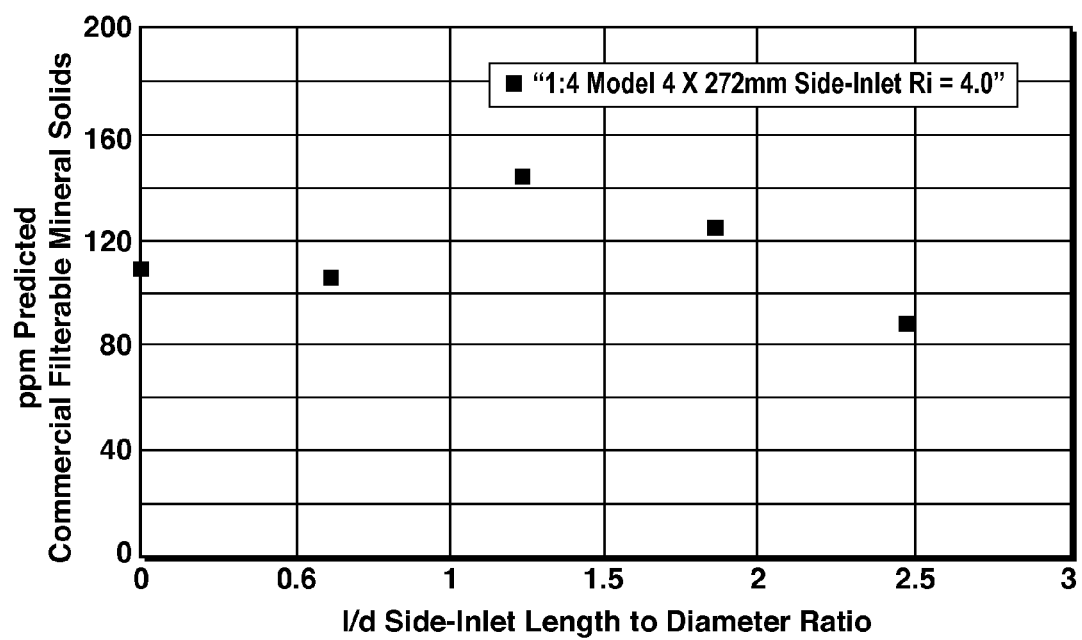
FIG. 6 is a graph showing the predicted commercial mineral solids concentration as a function of side-inlet l/d ranging from 0<l/d<2.5.

The influence of the l/d of the side-inlet was evaluated by varying the l/d from 0 to 2.5. FIG. 6 shows the variation in predicted commercial mineral solids carry-over with l/d. The embodiment of l/d=2.5 provides superior performance.

The gentle flow of solids down the wall in the side entry vessel (as in FIG. 7) is in stark contrast to the conventional deflector plate configuration, which exhibited a strong planer jet that impinged against the vessel side wall. This effect was very evident in the cold flow acrylic model, and resulted in the upwards billowing of particles above the point of impact. The side entry configuration imparts low momentum on the incoming solids. The horizontal side-inlet takes advantage of the segregation phenomena that occurs near the end of a horizontal discharge pipe where the dense slurry stream forms a layer flowing along the bottom of the inlet pipe with a recirculating clarified liquid layer above, resulting in a low momentum plunging flow as it enters the vessel. The formation of the low momentum densified layer, the recirculating clarified layer, and the low entrainment plunging behaviour, serves to retain fine particles that would otherwise be liberated from the bulk flow into the vessel.

The effect of the side-inlet Richardson number, and thus the relationship between the characteristic inlet opening diameter scale and flow rate through each side-inlet, has been established. It is therefore preferable to preserve the integrity of this characteristic inlet opening diameter scale in fouling service, where it may be possible to partially or fully occlude the inlet. A pure grade PTFE (polytetrafluoroethylene) Teflon™ liner has been demonstrated in pilot plant trials as an effective tool for fouling mitigation. Judicious application of pure grade PTFE Teflon lining near the entrance of the inlet piping may ensure that the side-inlet Richardson number would not decrease (or would not decrease to an unacceptable level), and therefore the settler performance would not degrade as a result of fouling.

In summary, the testing to date has covered a wide range of side-inlet Richardson numbers ranging from 0.1 to 13.2. Inlets with Ri>1.0 were observed to provide superior performance. Without intending to be bound by theory, this behavior may potentially be explained as follows. When the side-inlet Richardson number is below unity, the lateral (horizontal) velocity component of the inflowing material dominates, the side-inlet pipe is fully (or nearly fully) filled and a jet propagates into the interior of the settling vessel.

This jet then becomes vulnerable in the sense that particles may be more easily liberated from the bulk flow. As the side-inlet Richardson number increases, and buoyancy effects become more important, a densified layer forms along the bottom of the side-inlet with clarified fluid above, where the thickness of the discharging layer is controlled by a control condition at the discharge end of the pipe. This results in a low momentum inflow with limited entrainment, and a high propensity to plunge with little opportunity to liberate fine particles. The particularly robust performance with Richardson number between 2.3 and 13.2 can be attributed to the presence of a hydraulic control condition (Froude number of approximately 1) at the discharge end of the side-inlet pipe. At larger Richardson numbers there is an increased risk of particle deposition along the bottom of the side-inlet which may be problematic for some applications. The amount of deposition will depend on the properties of the coarse particles and the clarified fluid density. While the Richardson number could be well above 13.2, in one embodiment, the Richardson number is no more than 13.2, which value was tested as described herein.

The requirements and characteristics of high temperature paraffinic froth treatment (HTPFT) are somewhat unique. First, the properties and shape of the HTPFT particle size distribution (PSD) are somewhat unique, comprising coarse aggregates and fine mineral solids, while most conventional mineral separation processes have a more continuous PSD. This distinction is important. With a more continuous PSD, any reduction in flux (increased vessel cross-section area or reduced flow rate) yields a benefit. Ensuring a very uniform flow distribution and distributing the solids uniformly over the cross-section provides a benefit. This is because there is a significant fraction of the particles having terminal velocities approximately the same as the mean upward flux. However, with the coarse plus fines distribution found in the HTPTF process, efficiency gains are associated with improving fines scavenging. In this case, the terminal velocities of the larger particles are well in excess of the mean upward flux, and the terminal velocities of the smaller particles are well below the mean upward flux, and therefore changes in the mean flux, or improvements in the flow uniformity (to prevent higher localized upward velocities capable of calling up larger particles) are less, or even completely, unimportant. Secondly, the HTPFT requires an extremely high efficiency which requires the removal of virtually all the course material, which is relatively easy to do, and a significant portion of the fine solids which have terminal velocities well below the upward flux, which is more difficult. Thirdly, in the HTPFT, the risk of fouling limits the use of internals. It is important to note that the HTPFT and other processes where fouling may be a concern do not exclude the possibility of using internals, although the possibility of increased fouling should be borne in mind.

While the PSD characteristic of the HTPFT process may be somewhat unique, the instant design has broader application in other processes where there are both relatively large particles and relatively small solid particles, where fines capture is a priority, and where coarse particle removal is relatively easy.

Unlike conventional feed delivery in gravity settlers where the objective is to distribute the inlet feed over a broad cross-sectional area to optimize separation efficiency, an objective of this design is to create a low momentum non-entraining inflow, to avoid the release of fine solids. Spreading the inlet flow over the vessel cross-section with higher momentum was shown to simply increase the release of fines, resulting in increased carry-over. The inflowing dense layer is introduced in a manner which allows it to gradually release clarified liquid while retaining fine solids.

Optimum performance is observed when the side-inlet configuration is operated at a relatively high side-inlet Richardson number (Ri>1). This appears to result in a low momentum, single layer inflow, travelling along the bottom of the side-inlet with a recirculation zone of clarified fluid above. As the dense layer enters, the vessel it plunges aggressively, falling adjacent to the vessel sidewall toward the lower cone. The inflowing plume remains separate from the central region of the vessel where clarified fluid is flowing upward in the opposite direction. Segregation between the downward falling inlet stream(s) and the upward flowing central region, is important because it reduces shear between the two regions, limiting entrainment and limiting the release of fine particles. The falling plumes become increasingly dense as they enter the conical section, releasing clarified liquid which flows upward through the central region of the vessel. Limiting shear between these two zones (the falling plumes and the central upflow) appears to be important to limit the release of fine particles.

Provided that the flow rate is low enough to achieve a distinct single layer flowing along the bottom of the side inlet, separation performance is somewhat invariant to flow rate. As the flow rate varies, the layer thickness and layer velocity adjust to maintain a relatively constant discharge condition (Froude number of about 1 at the end of the inlet), resulting in a similar plume trajectory. This behavior appears to explain the robust performance with varying flow rate. Where l/d is low, for example 0, the distinct single layer is not formed.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of delivering a feed, the feed comprising a liquid component and a solid component into a separation vessel for separating the liquid component from the solid component, the separation vessel having a side wall, the method comprising:
   flow conditioning the feed; and
   delivering the feed into the vessel through one or more side inlets in the side wall, wherein the feed is delivered with a side-inlet Richardson number equal to or greater than 1.0, to encourage smaller solid particles of the solid component to be incorporated into, or trapped within or under, or dragged down by, larger solid particles of the solid component and to be carried to an underflow.

2. The method of claim 1 wherein the separation vessel is a gravity separation vessel.

3. The method of claim 1 wherein the one or more side inlets are fed by one or more pipes, respectively, the one or more pipes being substantially normal to the side wall of the separation vessel.

4. The method of claim 1 wherein the one or more side inlets are fed by one or more pipes, respectively, the one or more pipes being substantially horizontal and of sufficient length to achieve flow conditioning of the feed to deliver the feed with a side-inlet Richardson number equal to or greater than 1.0 and resulting in a slurry flowing as a layer along the bottom of the one or more pipes below a clarified liquid layer.

5. The method of claim 3 wherein the one or more pipes are flush in their inlet cross-sections with the side wall of the separation vessel.

6. The method of claim 1 wherein the feed is delivered with a side-inlet Richardson number equal to or greater than 2.0.

7. The method claim 1 wherein the feed is delivered with a side-inlet Richardson number equal to or greater than 2.3.

8. The method of claim 1 wherein the feed is a solvent-treated bitumen froth.

9. The method of claim 8 wherein the solvent is a paraffinic solvent.

10. The method of claim 1 wherein the solid component has a bi-modal size distribution.

11. The method of claim 1 wherein the solid component comprises precipitated asphaltene aggregates and mineral solids.

12. The method of claim 1 wherein the feed is delivered with a side-inlet Reynolds number in the range of 6,000 to 80,000 and with a vessel Reynolds number of 2,500 to 35,000.

13. The method of claim 1 wherein the feed is delivered at a flux of 200 mm/min to 700 mm/min.

14. The method of claim 1 wherein the feed is delivered using four inlets.

15. The method of claim 1 wherein flow conditioning elements are used for the flow conditioning.

16. The method of claim 15 wherein the flow conditioning elements comprise a perforated sparger and a perforated plate, the perforated sparger being upstream of the perforated plate.

17. The method of claim 1 wherein the feed is delivered with a side-inlet Richardson number of no more than 13.2.

* * * * *